United States Patent
Chen et al.

(10) Patent No.: US 11,436,507 B2
(45) Date of Patent: Sep. 6, 2022

(54) NORMALIZING WEIGHTS OF WEIGHTED TREE LEAF NODES

(71) Applicant: International Business Machines Corporation, Armonk, NY (US)

(72) Inventors: Yu-Ching Chen, North York (CA); Tuo Wang, North York (CA); Ziyue Jason Wang, North York (CA); Lior Aronovich, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 16/690,964

(22) Filed: Nov. 21, 2019

(65) Prior Publication Data

US 2021/0158192 A1    May 27, 2021

(51) Int. Cl.
*G06F 16/901* (2019.01)
*G06N 5/04* (2006.01)

(52) U.S. Cl.
CPC ......... *G06N 5/045* (2013.01); *G06F 16/9027* (2019.01)

(58) Field of Classification Search
CPC ............................ G06F 16/9027; G06N 5/045
See application file for complete search history.

(56) References Cited

U.S. PATENT DOCUMENTS

| | | |
|---|---|---|
| 5,321,815 A | 6/1994 | Bartolanzo, Jr. et al. |
| 6,182,058 B1 | 1/2001 | Kohavi |
| 7,962,480 B1 | 6/2011 | Zhang et al. |
| 8,085,888 B2 | 12/2011 | Ordentlich et al. |
| 8,443,281 B2 | 5/2013 | Lu et al. |
| 8,495,096 B1 | 7/2013 | Pereira et al. |
| 9,070,047 B2 | 6/2015 | Nowozin et al. |
| 10,223,409 B2 | 3/2019 | Aronovich et al. |
| 2008/0320278 A1* | 12/2008 | Liang ................ G06F 15/17337 712/E9.016 |
| 2011/0246498 A1* | 10/2011 | Forster ................. G06F 21/604 707/769 |
| 2018/0103084 A1* | 4/2018 | Auvenshine .......... G06F 16/215 |

* cited by examiner

*Primary Examiner* — Kris E Mackes
(74) *Attorney, Agent, or Firm* — Alex Harvey (57) ABSTRACT

Nodes of a weighted tree each have their own weight. A normalized weight of a node, relative to other nodes in the tree, is determined based on a proportional weight of the node and a lesser unique sum of the node, as well as those of the node's parents and grandparents, up to a root of the tree. The proportional weight and lesser unique sum of a given node depend only on the unique weights of the sibling group including the given node. Thus, if a weight is modified, the normalized weight can be updated without necessarily recalculating the entire tree.

20 Claims, 6 Drawing Sheets

NORMALIZING WEIGHTS OF WEIGHTED TREE LEAF NODES

BACKGROUND

The present disclosure relates to processor-based decision making, and more specifically, to caching attributes of weighted trees.

A weighted tree is a data structure used for a variety of different decision-making processes. Weighted trees can be used to navigate nested categories of choices or decisions, where each category has its own priority rating (weight) and each choice within the category has its own relative priority rating (weight) as well.

Weighted trees are made of an interconnected set of "nodes," where each node has one parent (except the "Root" node) and can have varying amounts of siblings and/or children. Generally, there are three types of nodes. Every weighted tree has a "Root" node, typically illustrated as the highest-level node. In addition, weighted trees include several lower-level nodes, which may either be "intermediate" nodes or "leaf" nodes. Note that "intermediate" nodes are often simply called "nodes." "Leaf" nodes are distinct in that they have no children. Leaf nodes can be used to represent final decisions, while intermediate nodes can be used to represent "categories" (which may include multiple decisions or even other categories, and so on).

Every intermediate and leaf node has a "weight." When using the weighted tree to decide an action to take, a decision process may start from the root and select a child node based on their relative weights, repeating this process until a leaf node is selected.

SUMMARY

Some embodiments of the present disclosure can be illustrated as a method. The method may include receiving a weighted tree. The weighted tree may have a plurality of nodes, including a first node with a first weight and a second node with a second weight. The method may further include determining, based on the weights, a normalized weight of the first node. This may include determining a proportional weight of the first node, determining a lesser unique sum of the first node, where the normalized weight is determined based on the proportional weight and the lesser unique sum.

Some embodiments of the present disclosure can also be illustrated as a computer program product including a computer readable storage medium having program instructions embodied therewith, the program instructions executable by a computer to cause the computer to perform the method discussed above.

Some embodiments of the present disclosure can be illustrated as a system. The system may include memory and a central processing unit (CPU). The CPU may be configured to receive a weighted tree. The weighted tree may have a plurality of nodes, including a first node with a first weight and a second node with a second weight. The CPU may also be configured to determine, based on the weights, a normalized weight of the first node. The determining may include determining a proportional weight of the first node and determining a lesser unique sum of the first node. The CPU may be configured to determine the normalized weight may be based on the normalized weight and the lesser unique sum.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to processor-based decision making, and more specifically, to caching attributes of weighted trees.

Throughout this disclosure, reference is made to "nodes" of a weighted tree. As discussed in the Background section, weighted trees include leaf nodes, intermediate nodes, and a root node. As used herein, "nodes" refers to either a leaf node or an intermediate node (i.e., excludes the root node) unless specifically stated otherwise. A leaf node is a node that has no children, while an intermediate node has at least one child node (which may be a leaf or another intermediate node, depending upon whether the child node has children of its own). The root node has no parents, making it the "highest-level" node in the tree. Nodes can have any number of children (including zero, which would mean the node is a leaf node). If a node has more than one child node, those child nodes are referred to herein as "siblings" with respect to each other. For example, if the root has three children, node A, node B, and node C, then node A has two siblings: nodes B and C. Node C also has two siblings: nodes A and B. Further, nodes A through C are referred to as a "sibling group." If node C has two children of its own, node D and node E, then nodes D and E comprise a separate sibling group. In such a tree, nodes A, B, D, and E would be leaf nodes, while node C would be an intermediate node, as node C is the only non-root node with children. Node C is referred to as the "parent node" of node D and node E.

Weighted trees may be used to aid in processor-driven decision-making processes (i.e., decision-making processes in which analysis is performed by a computer system and a decision or recommendation is made based on that analysis). Processor-driven decision-making processes may be useful for complicated decisions that involve many variables, particularly when those variables may change. A computer system with one or more processors (e.g., central processing units, graphical processing units) may be useful to automate those complicated decisions. However, computer systems analyze information and make decisions based on that analysis differently than humans do. For example, humans may subjectively consider information as an amalgamated mass of information, whereas computer processors consider information as discrete data points. Further humans may rely on subjective judgment and instincts when making decisions, whereas computer processors rely on defined rules and relationships. For these reasons, decision frameworks for processor-driven decision-making processes are typically formulated differently when employing processor-driven decision making. Formulating a decision as a weighted decision tree, while not typically useful for human decision-making processes, may enable a computer processor to perform some complex decisions.

For example, a hotel with limited availability may prefer to rent rooms out to specific guests (such as rewards program members, employees of favored companies, etc.). However, this preference may be organized in multiple levels; for example, a CEO of a favored company may be more preferable than a lower-level employee. These levels of organization can be represented by nodes having children, siblings, etc.; the favored company may be a first node with a first weight, while the rewards program may be a second node with a second weight. Both nodes may have children representing subcategories. For example, the first node may have several children nodes, each representing a job title at the company (and each having its own weight), while the second node may have children representing various tiers of the rewards program (each having its own weight as well). When deciding whom to rent a room to, a hotel may look to weights of these nodes. Thus, the CEO be represented as a node with a higher weight than a lower-level employee, but both nodes are children of the favored-company node, which has its own weight. Comparing a preference for a mid-tier rewards program member to a lower-level employee of the favored company may not be as simple as comparing weights of their respective nodes, as the decision would be skewed by overall preference between the company and the program (i.e., the weights of the parent nodes). This becomes more pronounced as the tree gets larger and more complicated.

To help alleviate this issue, weights of nodes may be "normalized." While a weight of a node is relative to siblings of that node, a normalized weight of the node is relative to all other nodes in the tree. Thus, normalized weights advantageously enable direct comparisons of nodes, even if the nodes are not siblings.

Figure 1:
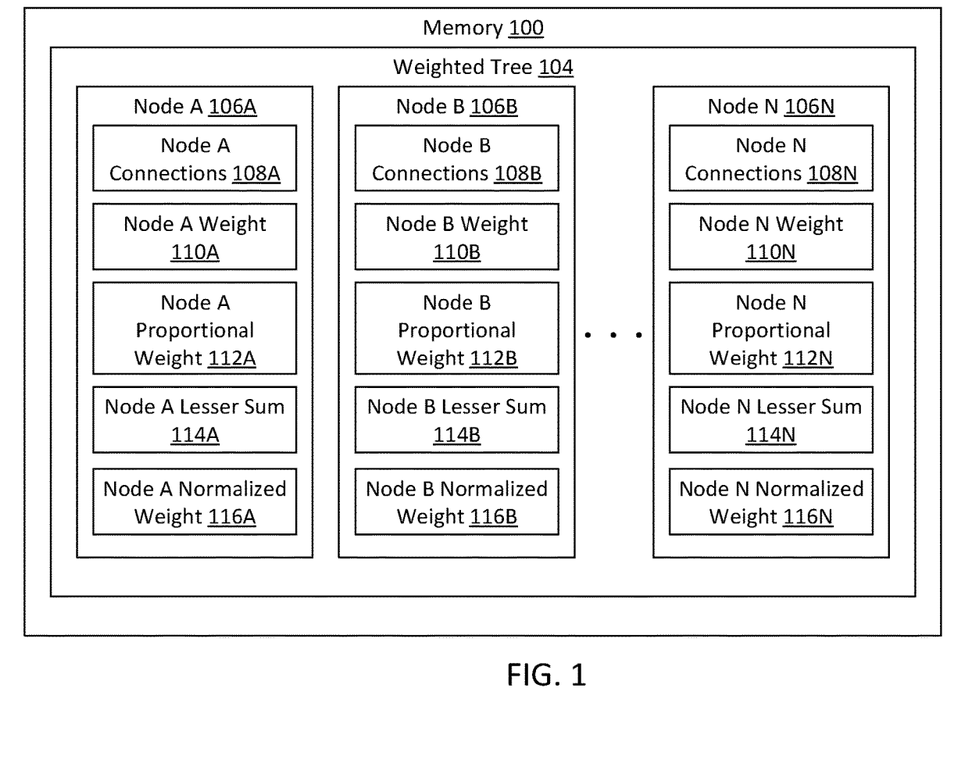
FIG. 1 illustrates a high-level block diagram of a memory including an improved layout for storing a weighted tree according to several embodiments of the present disclosure.

FIG. 1 illustrates a high-level block diagram of a memory 100 including an improved layout for storing a weighted tree. Memory 100 may comprise, for example, volatile or non-volatile memory such as random access memory (RAM), one or more hard disk drives (HDDs), solid state drives (SSDs), etc. Memory 100 is configured to store a weighted tree 104. In particular, memory 100 stores information regarding the nodes of weighted tree, such as node A 106A, node B 106B, and so on including node N 106N (collectively "nodes 106"). Note that nodes 106 are labeled "nodes" as a general term; they may comprise leaf nodes or intermediate nodes. In some embodiments, weighted tree 104 may also include a root node (not shown in FIG. 1).

Notably, for non-root nodes, memory 100 includes information regarding a "proportional weight" 112 and a "lesser sum" 114. As will be described in further detail below, storing this information in memory 100 advantageously enables determining normalized weight 116 with fewer calculations than typical weighted trees, improving performance of a system implementing weighted tree 104. Further, typical processor-drive decision-making systems typically recalculate the entire tree whenever a node is added, removed, moved or otherwise modified. However, the improved layout of memory 100, in combination with the methods described herein, result in significant improvement of various systems by reducing wasteful and/or redundant operations when modifying weighted trees.

Node A 106A includes connection information 108A, which identifies other nodes 106 that node A 106A is connected to as well as the nature of those connections (e.g., "child," "parent," etc.). Node B 106B and node N 106N include connection information 108B and 108N, respectively. Node A 106A also includes a weight 110A. This is generally a non-negative integer (i.e., zero or greater) and may represent, for example a preference level for node A 106A, particularly relative to any siblings that node A may have. Higher weights may indicate a higher preference. In some embodiments, weight may be a decimal value and/or a negative value, but for ease of explanation, the examples described herein utilize whole numbers.

Node A 106A also includes a proportional weight 112A. This value represents node A's weight divided by the total sum of the unique weights of each node in the same sibling group as node A. For example, if node A has no siblings, proportional weight 112A is effectively node A's weight 110A divided by itself (equaling 1.0). If node A has two siblings, node B 106B with weight 110B and node N 106N with weight 110N, then, assuming none of these three weights are equal, proportional weight 112A would be weight 110A divided by the sum of weights 110A, 110B and 110N. Note that for the denominator sum, every unique weight of the sibling group is only added once; if two or more nodes of a sibling group share a weight, only one instance of that weight is added to the sum. For example, if weight 110B is equal to weight 110A (but weight 110N is different), then proportional weight 112A would be weight 110A divided by the sum of weight 110A and weight 110N. Of course, this could also be written as weight 110A divided by the sum of weight 110B and weight 110N. Therefore, if all nodes of a sibling group have the same weight, then all of their proportional weights are equal to one (because each proportional weight would be the node's weight divided by the only unique weight, i.e., itself).

Since it is possible for weights 110 to be zero, if all nodes in a sibling group had a weight of zero, then on some systems attempting to calculate proportional weight 112 for a node in such a sibling group may result in a "divide by zero" error. This is only possible if all weights of a sibling group are identical which, as has already been discussed, results in each sibling sharing a proportional weight of one.

Thus, to alleviate this "divide by zero" issue, systems may determine whether all siblings share a weight of zero as a special case before attempting to calculate proportional weight 112, manually setting each sibling's proportional weight to one (circumventing the calculation and thus the error) if this situation is detected.

Node A 106A also includes a "Lesser Unique Sum" 114A. This value represents the sum of the proportional weights of unique lesser-weighted sibling nodes. A "lesser-weighted sibling" refers to a node in the same sibling group with a weight value that is lower than the weight of the node in question. For example, if node A 106A has a weight 110A of 5 and node A has a first sibling, node B 106B, with weight 110B=2 and a second sibling, node N 106N with weight 110N=7, then node A would have one lesser-weighted sibling (node B). In this example, node B's proportional weight 112B would be weight 110B divided by the sum of all three of these weights (since all three weights are unique), which would be 2/(5+2+7)=2/14 =1/7. Since this is the only lesser-weighted sibling of node A, this value (1/7) would be node A's lesser unique sum 114A. Further, since node B 106B has no lesser-weighted siblings (as it is the lowest-weighted node in the sibling group), node B's lesser unique sum 114B is zero. As node N 106N has two lesser-weighted siblings (node A and node B), node N's lesser unique sum 114N would be the sum of both of their proportional weights (112A and 112B). Proportional weight 112A is weight 110A divided by the sum of all unique weights (110A, 110B and 110N), which in this example is 5/(5+2+7)=5/14, while proportional weight 112B=2/14. Thus, lesser unique sum 114N=5/14+2/14=7/14=1/2.

Node A 106A also includes normalized weight 116A. This value represents node A's weight 110A relative to the weight of all other nodes in the weighted tree. In essence, normalized weights 116 allow for direct comparison of node weights regardless of where they exist in the weighted tree (for example, comparing nodes from different sibling groups or on different levels of the weighted tree). Normalized weight 116A is determined based on proportional weights and lesser unique sums of node A 106A, node A's parents, "grandparents," and so on all the way up to the root node. The generalized calculation for normalized weight is shown below as Equation 1, where "w" refers to proportional weight and "s" refers to the lesser unique sum (numbered based on levels of the tree):

$$N. \text{Weight} = (((((((w_1)+s_1)*w_2)+s_2)*w_3)+s_3) \ldots *w_n)+s_n) \quad (1)$$

Based on Equation 1, normalized weight 116A is calculated based on proportional weight 112A (w1) and lesser unique sum 114A (s1), as well as proportional weights and lesser unique sums of node A's parent node (w2 and s2, respectively), and node A's parent's parent node (w3 and s3), and so on all the way up to the node just below the root node (wn and sn). In some embodiments, the root node itself does not have a proportional weight or lesser unique sum and so the root node is not considered for purposes of proportional weight. Alternatively, in some embodiments the root node may have values for a proportional weight and lesser unique sum, although these values would be one and zero, respectively, which would have no impact on proportional weight calculation regardless.

Node B 106B and node N 106N have their own normalized weights 116B and 116N, respectively, which may also be calculated using Equation 1. Further, node B and node N, as siblings of node A 106A, have the same "parentage" and thus their normalized weight calculations may be similar to that of 116A. For example, Equation 1 for normalized weight 116B may have the same terms for w2, s2, w3, s3 and so on to wn and sn, but w1 and s1 would be proportional weight 112B and lesser unique sum 114B. Thus, normalized weights 116B and 116N themselves will vary if the nodes' own proportional weights 112 and lesser unique sums 114 differ from 112A and 114A. However, if node A had an additional sibling ("node C") with a weight equivalent to weight 110A, then node C's proportional weight and lesser unique sum would be equivalent to those respective values of node A (i.e., 112A and 114A). Therefore, the w1 and s1 terms of Equation 1 would be equivalent when calculating a normalized weight of node C, and since the nodes are siblings, the parentage terms would be identical as well. Thus, node C and node A would have the same normalized weight. Note further that, because node C's weight is not "unique" (as it is identical to weight 110A of node A), adding this node C would not change any of the calculations or final values of any of proportional weights 112, lesser unique sums 114, or proportional weights 116 for any of nodes 106.

Notably, as the normalized weight 116 of a node depends solely on proportional weights 112 and lesser unique sums 114 of the node as well as those of specific other nodes (i.e., the node's parents), modifications that do not affect these values accordingly do not affect the node's normalized weight. Thus, adding a node D as a child of node A would not affect any of the normalized weights 116 of any of nodes A, B, C or N. Further, adding a node E as a sibling to node A's parent node, if node E's weight is the same as node A's parent's weight, would also not affect any of the normalized weights 116. This phenomenon and its resulting improvement in efficiency is explained in further detail below with reference to sample weighted tree 200 of FIG. 2 and methods 300, 400 and 500 of FIG. 3, FIG. 4 and FIG. 5, respectively.

Figure 2:
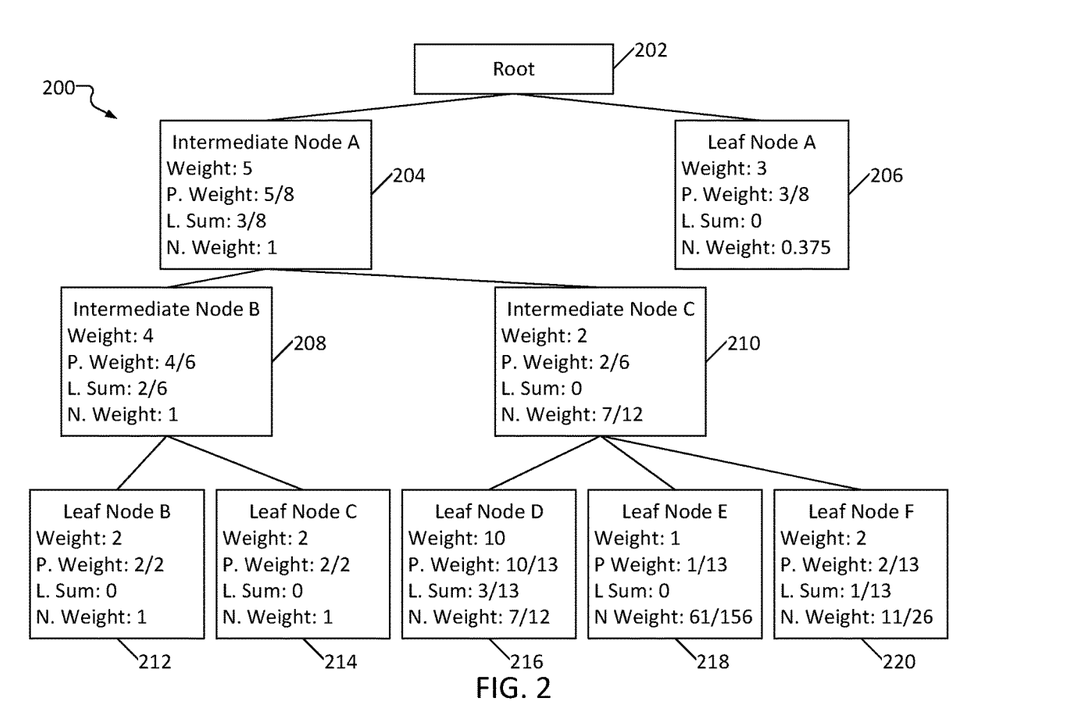
FIG. 2 illustrates a high-level block diagram of an example weighted tree, including cached values such as proportional weights and lesser sums, consistent with several embodiments of the present disclosure.

FIG. 2 illustrates a high-level block diagram of an example weighted tree 200, including cached values such as proportional weights and lesser sums, consistent with several embodiments of the present disclosure. Tree 200 includes ten total nodes, numbered 202-220: a root node 202, three intermediate nodes (node A 204, node B 208 and node C 210), and six leaf nodes (leaf A 206, leaf B 212, leaf C 214, leaf D 216, leaf E 218 and leaf F 220).

Parentage is also identified in FIG. 2. For example, node A 204 has two children, i.e., node B 208 and node C 210. Node B 208 has two children, i.e., leaf B 212 and leaf C 214. Node C 210 has three children, i.e., leaf D 216, leaf E 218 and leaf F 220.

There are four sibling groups in tree 200. Node A 204 and leaf A 206 are siblings in that they are both children of the same parent (root 202). Node B 208 and node C 210 are both children of node A 204, and thus node B 208 and node C 210 are a second sibling group. Leaf B 212 and leaf C 214 are siblings as well. Leaves D, E and F are a fourth sibling group as children of node C 210. Notably, leaves D, E and F are not siblings of leaves B and C, even though leaves D, E and F are on the same "level" of tree 200 as leaves B and C. Using a family tree analogy, leaf D would be a "cousin" to leaves B and C.

Nodes 204-220 of tree 200 include values for weight, proportional weight ("P. Weight"), lesser unique sum ("L. Sum") and normalized weight ("N. weight"). Example values are already filled in for tree 200. In some embodiments, a weighted tree such as tree 200 may be initially received or generated with only the relationships/layout and weights of the nodes; proportional weights, lesser unique sums and normalized weights may need to be calculated for each node 204-220. An "initialization" calculation to determine the proportional weight, lesser unique sum, and normalized weights of every node in a tree can be performed according to method 300 of FIG. 3, as described in further detail below. In general, these values may be determined according to the definitions described above, such as utilizing Equation 1 to determine normalized weight.

As demonstrated by tree 200, when all nodes of a sibling group share the same weight (such as leaf B 212 and leaf C 214 each having a weight of 2), their proportional weight, lesser unique sum, and normalized weight are also shared. Also, node A, node B and both leaves B and C have normalized weights of 1. If a node has a normalized weight of 1 and also has at least one child node, then the child(ren) of the node with the highest weight will also have a normalized weight of 1. In other words, there will always be at least one "string" of nodes with a normalized weight of 1.

Figure 3:
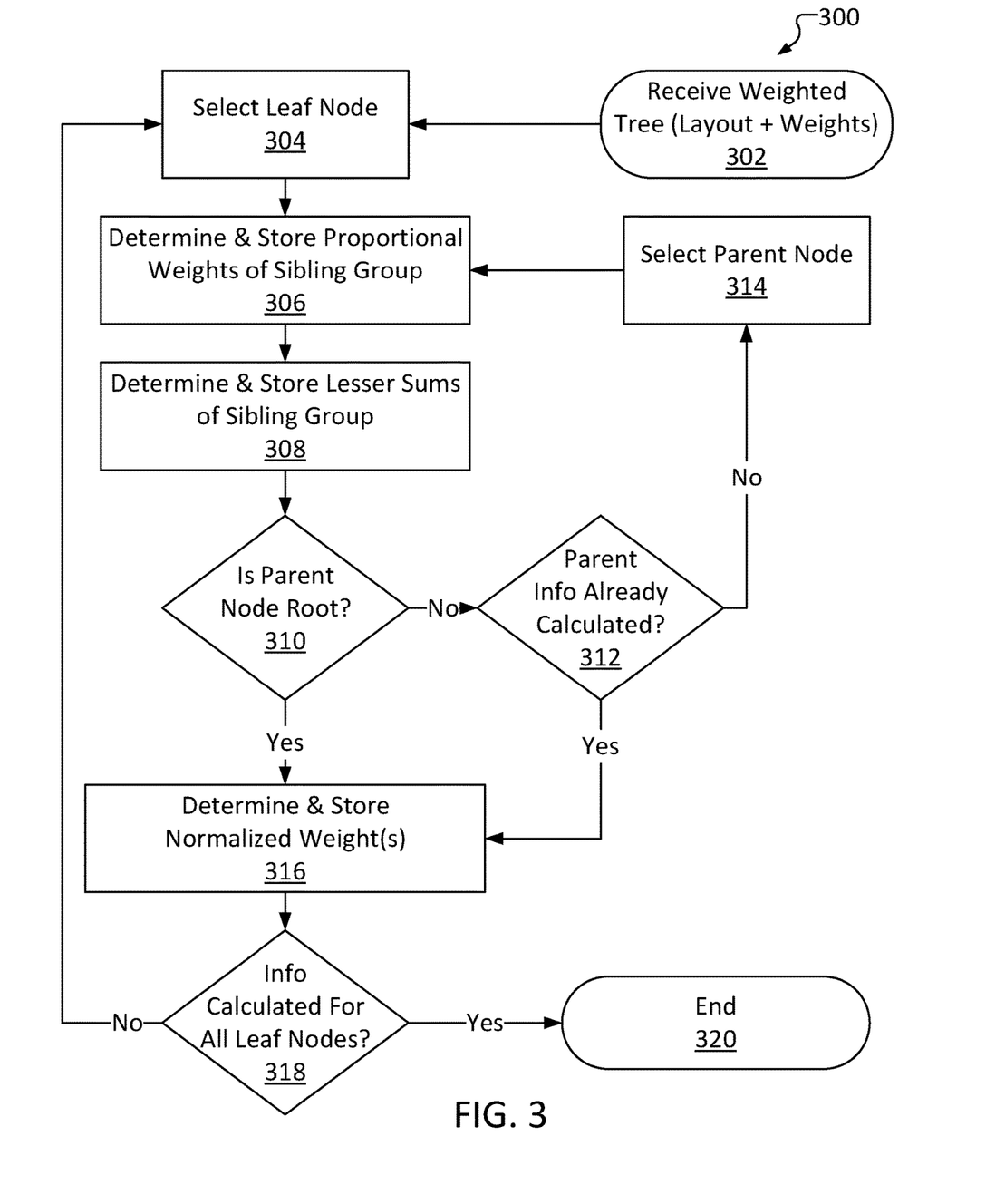
FIG. 3 illustrates a high-level block diagram of a fast bottom-up weighted tree initialization method according to several embodiments of the present disclosure.

FIG. 3 illustrates a high-level block diagram of a fast bottom-up weighted tree initialization method 300 according to several embodiments of the present disclosure. Method 300 may be performed, for example, by a computer processor (e.g., a central processing unit or a graphical processing unit such as, for example, processor 602 of FIG. 6) that is configured to utilize a weighted tree to help make a complicated decision. As discussed below, method 300 represents an improved method of utilizing weighted trees to perform processor-based decision making, causing the computer processor to arrive at a decision faster and more efficiently.

In describing method 300, reference is made to the example weighted tree 200 and its nodes 202-220. This reference is not intended to be limiting; method 300 can be applied to any weighted tree to determine proportional weights, lesser unique sums, and normalized values of nodes in a tree. For purposes of describing method 300, weighted tree 200 will be described as if proportional weights, lesser unique sums and normalized weights of nodes 204-220 are initially unknown.

In essence, method 300 is a bottom-up calculation that selects a leaf node of a weighted tree, calculates a normalized weight for it, and selects another leaf node, iterating through the weighted tree until all normalized weights have been calculated. This bottom-up process represents an atypical use of a weighted tree, but can be utilized to increase the speed by which a processor can analyze the tree initially or after the tree data is updated. A given leaf node's normalized weight may be determined by calculating proportional weight for the leaf node and its siblings, selecting the leaf's parent node, and repeating these steps until the root node is reached. Once the proportional weights and lesser unique sums of the leaf node and all of its higher-level nodes are known, the normalized weight of the leaf node (and, optionally, the normalized weights of all the higher-level nodes) may be calculated. Then, another leaf node may be selected, and the process may repeat. Thus, if all leaf nodes are iterated through, then method 300 may include calculating and storing proportional weights, lesser unique sums, and normalized weights for every node in the tree, while advantageously avoiding redundant calculations.

Method 300 includes receiving a weighted tree 302, the weighted tree including a layout of nodes and weights for the nodes. This may include, for example, a computer system (such as, for example, computer system 600 of FIG. 6) receiving a weighted tree such as tree 200 and storing it in memory, such as memory 100 of FIG. 1. The nodes of the weighted tree may be stored as nodes 106A-106N of memory 100, with weights stored as weights 110. However, the weighted tree may not initially include information regarding proportional weight, lesser unique sum, or normalized weight for some or all of the nodes. For example, operation 302 may include receiving the layout of nodes 202-220 (including intermediate nodes A-C and leaves A-F, including their parents, children, and/or siblings, as well as root 202). This may further include receiving the weights of nodes 204-220 (e.g., that leaf D has a weight of 10, that leaf F has a weight of 2, etc.), but the received tree may not include information identifying proportional weight, lesser unique sum, and/or normalized weight for some or all of the nodes.

To determine these values, method 300 further includes selecting a leaf node 304. As described above, a leaf node is a node that has no children. Thus, this can be performed by selecting a node and determining whether it has any children, searching a library of nodes for any that have no children, etc. In some embodiments, operation 304 may include selecting a leaf node at a "lowest" level of the tree (meaning furthest removed from the root node). In some embodiments, the leaf node may be selected randomly. In some embodiments, a system performing method 300 may select the first leaf node identified. In some embodiments, the system may determine whether the leaf node already includes information regarding proportional weight, lesser unique sum and normalized weight; if these values are already known for the initially-selected leaf, operation 304 may include selecting a different leaf.

Once a leaf node (for example, leaf F 220) is selected, method 300 includes determining and storing proportional weights of the sibling group of the selected node 306. This may include, for example, determining weights of the selected node and each of its siblings (if it has any). Once the weights are determined, the weight of the selected node is divided by the sum of all unique weights of the sibling tree. For example, if the selected node is leaf F 220, operation 306 may determine the weights of the sibling group (leaf D 216's weight of 10, leaf E 218's weight of 1, and leaf F 220's weight of 2) and divide leaf F's weight (2) by the sum of the unique weights of the sibling group (10+1+2=13). Thus, leaf F's proportional weight is 2/13. Operation 306 may further include performing similar calculations for siblings of the selected leaf (such as, for example, determining that leaf D's proportional weight is 10/13 and leaf E's proportional weight is 1/13). However, in some embodiments operation 306 may include determining whether these values have already been determined for the sibling group to prevent performing redundant calculations. Once these values are determined, they are stored in memory (such as memory 100). For example, leaf F's proportional weight of 2/13 may be stored in a data field such as proportional weight 112N (if leaf N 106N represented leaf F 220).

Method 300 further includes determining and storing lesser unique sums for the selected node and its siblings 308. This may include, for example, determining which (if any) siblings of the selected node have a weight less than the weight of the selected node. For example, if leaf F is selected, operation 308 includes determining that leaf E has a lesser weight (of 1) than leaf F (which has a weight of 2), while leaf D (with a weight of 10) does not have a lesser weight. Operation 308 further includes determining a sum of the proportional weights of each of the unique lesser-weighted siblings. As leaf E is the only lesser-weighted sibling of leaf F, leaf F's lesser unique sum would simply be equivalent to leaf E's proportional weight (i.e., 1/13). Note that if leaf F had another sibling ("leaf G") with a weight of 1, leaf F's lesser unique sum would still be 1/13, as leaf G's weight would not be unique (leaf G and leaf E would have the same weight of 1) and therefore may not be considered in the calculation. Once these values are determined, they are stored in memory (such as memory 100). For example, leaf F's lesser unique sum of 1/13 may be stored in a data field such as lesser unique sum 114N (if leaf N 106N represented leaf F 220).

Once these values have been determined, method 300 further includes determining whether the selected node's parent is the root node 310. For example, if the selected node were leaf F 220, operation 310 may determine that leaf F's parent, node C 210, is not the root node 202 and thus operation 310 would result in a "no." If the selected node were, for example, node A 204, then operation 310 may result in a "yes" as node A's parent is root 302.

If the selected node's parent is not the root node (310 "no"), method 300 includes checking to determine whether the proportional weight and lesser unique sum selected node's parent has already been determined 312. The proportional weight and lesser unique sum of the node's parent (and its parent and so on, up to the root node) is needed for determining the selected node's normalized weight, as shown in Equation 1.

If the values for the parent node have not been determined (312 "no"), method 300 proceeds to select the parent node 314. For example, this may include selecting node C 210. After selecting the parent node 314, method 300 repeats operations 306 and 308 for the parent node. As node C 210 has a weight of 2 and a single sibling (node B 208) with a weight of 4, this results in a proportional weight of 2/6 (or 1/3) for node C and 4/6 (or 2/3) for node B. As node C has no unique lesser-weighted siblings, node C's lesser unique sum is zero, while node B's lesser unique sum is 2/6 (node C's proportional weight). These values are also stored in memory, such as memory 100. Once these values are determined and stored, method 300 proceeds to determine whether the selected node's parent is the root node 310. Continuing with the example of tree 200, this may include determining whether node C 210's parent is root node 202. Since node C's parent is node A 204, the result of this iteration of determination 310 would also be "no." This may result in determining whether node A 204's information has been calculated already 312, and if not, selecting node A 314 and calculating the information (306 and 308), then determining whether node A's parent is the root node 310. Once the highest-level non-root parent node has been selected (such as node A 204), determination 310 results in a "yes" and method 300 proceeds to determining and storing normalized weight(s) 316.

In some embodiments, operation 312 may optionally determine whether the normalized weight of the selected node's parent has been determined as well, which may be beneficial if normalized weights of the entire tree are desired. However, in some embodiments, only normalized weights of leaf nodes are desired (i.e., normalized weights of intermediate nodes may not be useful), so if proportional weight and lesser unique sum of the selected node's parent are already known, then method 300 may proceed (312 "yes") to determine the normalized weight of the initially-selected node 316.

Thus, method 300 selects a leaf node and calculates the proportional weight and lesser unique sum of the selected leaf node and its parents, all the way up to the root node, except that it stops "early" once it reaches a parent node whose information has already been calculated. As these steps may be repeated for several leaf nodes (some of which may be siblings and thus share a parent), checks such as 312 may advantageously reduce redundant calculations. Further, as operations 306 and 308 may include determining these values for siblings as well, checking whether the parent's values have already been calculated 312 may further reduce redundant calculations.

Once the root node is reached (310 "yes") or the selected node's parent's information has already been calculated (312 "yes"), method 300 proceeds to determining and storing normalized weight(s) 316. This includes determining the normalized weight for the leaf node selected at operation 304 using Equation 1. For example, if operation 304 comprised selecting leaf F 220, then operation 316 includes determining the normalized weight of leaf F via Equation 1, which would be $((((((wF)+sF)*wC)+sC)*wA)+sA)$, where "wF" refers to the proportional weight of leaf F, "sF" refers to the lesser unique sum of leaf F, "wC" refers to the proportional weight of node C, and so on. Thus, the normalized weight of leaf F, according to Equation 1, is $((((((2/13)+1/13)*2/6)+0)*5/8)+3/8)=11/26$. Operation 316 further includes storing the normalized weight in memory such as, for example, memory 100.

Further, in some embodiments, operation 316 may include determining the normalized weight for each of the "parent" nodes selected at any instances of operation 314. For example, if proportional weight and lesser unique sum of node C 210 and node A 204 had not been previously calculated until after leaf F 220 were selected at operation 304, operation 316 may include determining and storing normalized weights of node C and node A, also using Equation 1. For example, the normalized weight of node C 210 is calculated as: $((((wC)+sC)*wA)+sA)=((((2/6)+0)*5/8)+3/8)=7/12$, and the normalized weight of node A is $((wA)+sA)=((5/8)+3/8)=1$.

After operation 316, method 300 includes determining whether the normalized weight has been calculated for all leaf nodes 318. In some embodiments a weighted tree may be received with some normalized weights already known (but proportional weight and lesser unique sum information may not have been included). Thus, in some embodiments, operation 318 may further include checking whether the proportional weight and lesser unique sum has been calculated for all leaf nodes, although this check may be redundant if all normalized weights were calculated via method 300 (since the proportional weights and lesser unique sums are required in order to determine the normalized weights, as per Equation 1).

If the information has not yet been calculated for all leaf nodes (318 "No"), method 300 selects another leaf node 304 (whose information has not yet been calculated) and iterates through operations 306-316 as described above. Notably, when selecting and calculating normalized weights for additional leaf nodes, check 312 is much more likely to result in a "yes." Further, if proportional weights and lesser unique sums are being calculated for entire sibling groups in operations 306 and 308, a similar check may be performed prior to 306; if the sibling group's proportional weights and lesser unique sums have already been calculated, 306 and 308 may be skipped and method 300 may proceed from selecting a leaf node 304 directly to determining whether the selected node's parent node is the root node 310.

Once the normalized weight has been determined for every leaf node (318 "Yes"), the weighted tree has been calculated and method 300 ends 320. Note that in embodiments wherein operation 316 includes determining and storing normalized weights for the selected leaf node as well as its parent nodes, 318 will still be able to simply check whether all leaf nodes have normalized weights; if the intermediate node normalized weights are being calculated, the structure of method 300 will have calculated all of them over the course of doing so for the leaf nodes.

Figure 4:
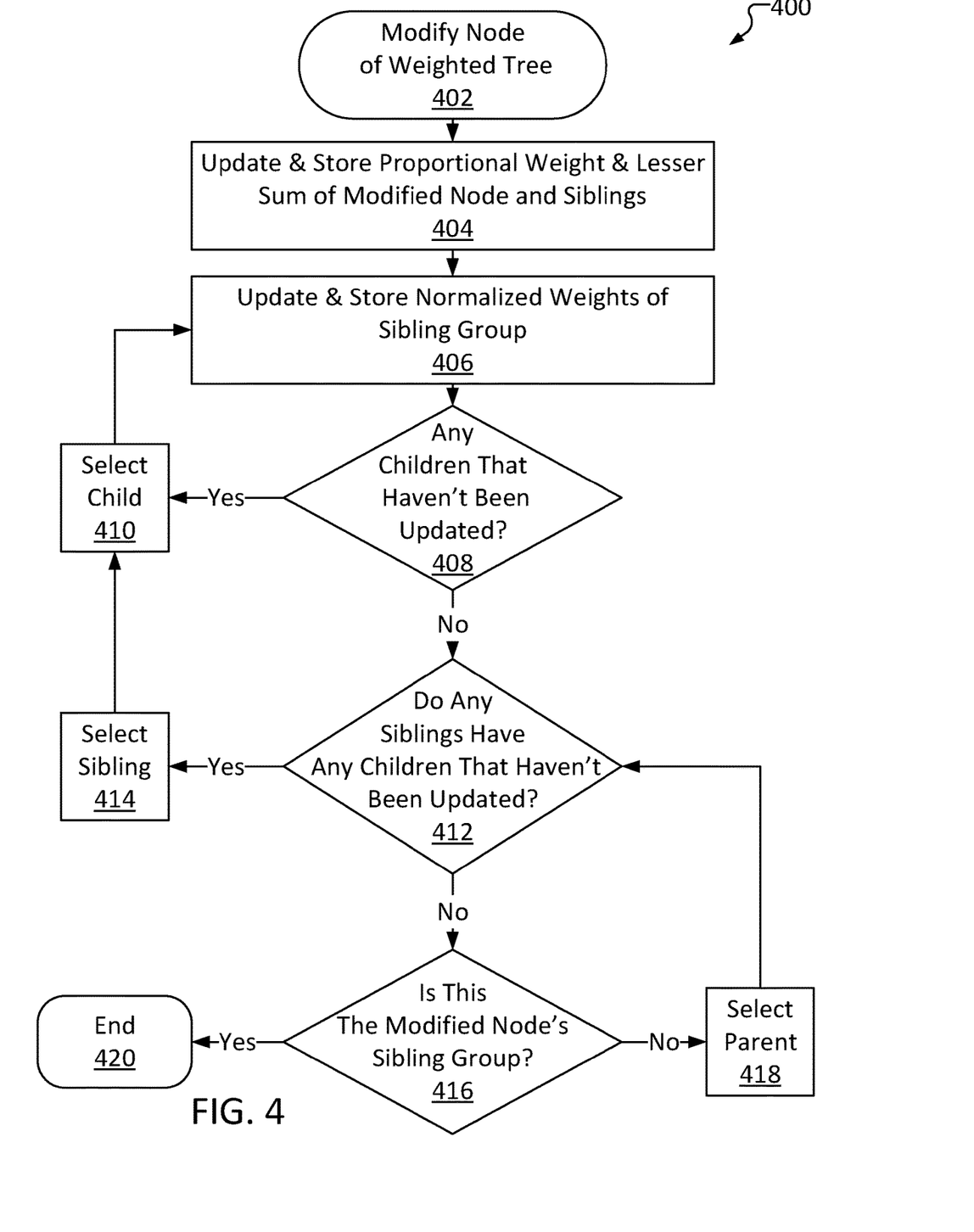
FIG. 4 illustrates a high-level block diagram of a weighted tree update method based on modifying a single node according to several embodiments of the present disclosure.

FIG. 4 illustrates a high-level block diagram of a weighted tree update method 400 based on modifying a single node according to several embodiments of the present disclosure. Method 400 includes modifying a node of a weighted tree 402. This may include, for example, adding a new node, deleting an existing node, or modifying a weight of an existing node. Note that, as referred to herein, moving a node from a first location to a second location may be considered as two modifications. For purposes of describing method 400, operation 402 may also include "selecting" the modified node.

Method 400 further includes updating and storing the proportional weights and lesser unique sums of the modified node and any siblings in its sibling group 404. For example, if a new node is added to a sibling group, the new node's weight will be divided by the sum of the unique weights of the sibling group to determine a proportional weight for the new node. Further, the proportional weights of all unique lesser-weighted siblings will be added to determine the lesser unique sum for the new node. In addition, if the weight of the new node is unique amongst the sibling group, the proportional weights and lesser unique sums of the other nodes of the sibling group may need to be recalculated.

Notably, however, if a new node is added with the same weight as another node of the sibling group, the new node's proportional weight, lesser unique sum, and normalized weight will be identical to those of the node with the same weight, so these values can be simply copied rather than recalculating them. This may not be the case if a node is modified from a first weight to a second weight, where the second weight is the same as the weight of another node in the sibling group. This is because changing the node's weight may alter the sum of unique weights of the sibling group, and thus alter the proportional weights and lesser unique sums of the nodes in the group. However, if the first (old) weight is shared with a first sibling's weight and the second (new) weight is shared with a second sibling's weight, then only the modified node's proportional weight, lesser unique sum and normalized weight will change; all siblings' values may remain unaffected.

If a node is deleted and the deleted node shared a weight with a sibling, the proportional weights, lesser unique sums and normalized weights of the remaining siblings will remain unaffected. If a deleted node had a unique weight, the values for the siblings may need to be recalculated. If a deleted node had no siblings or children, no values in the weighted tree need to be updated (with the possible exception of the deleted node's parent's "connection" information, depending upon how the weighted tree's layout is stored), and thus method 400 will end after deleting the node.

Notably, due to how proportional weight and lesser unique sum are determined, modifying a node can only affect the proportional weights and lesser unique sums of the modified node and its siblings; those values of parents, children, "cousins," etc. of the modified node are unaffected. Normalized weights of some of these nodes, however, may need to be updated.

The "maximum" boundary of nodes that may need to be updated after a node is modified, added, or deleted can be described as a "subtree." A subtree is, in effect, a partition of the weighted tree, generated by considering a particular node of the weighted tree as a "root" node of the subtree. For example, if node C 210 of weighted tree 200 is to be considered the root of a subtree, the subtree would include node C 210, leaf D 216, leaf E 218 and leaf F 220. This may be useful as, whenever a node is modified, only nodes within a subtree whose root is the modified node's parent may need to be updated. In other words, as an example, if node C 210 were modified, then the relevant subtree would have node C's parent (node A 204) as a root. Thus, only nodes B and C (208 and 210, respectively) and their children, leaf nodes B-F (212-220, respectively) may need to have their normalized weights updated. Notably, leaf A 206's normalized weight will not be affected by modifying node C 210. If leaf node A 206 had any children (which would mean leaf node A 206 was not a leaf node), those children's normalized weights would also be unaffected by modifying node C 210, as they would not fall within the subtree.

Throughout this disclosure, reference is made to "updating a subtree." As used herein, updating a subtree refers to determining, for each node in a subtree, whether a normalized weight of the node is out of date and, if it is, determining a new normalized weight and overwriting the outdated value. Updating a subtree further refers to determining, for each node in the highest-non-root-level sibling group of the subtree, whether a proportional weight and lesser unique sum is out of date and, if they are, determining new values for them and overwriting the outdated values. "Highest-non-root-level sibling group" refers to the sibling group at the highest level of the subtree, excluding the subtree's root node. For example, if node C 210 were modified, the appropriate subtree to consider would utilize node A 204 as a subtree root node. Therefore, the highest-level sibling group of the subtree would be the sibling group comprising node B 208 and node C 210. Thus, only nodes B and C may need to have their proportional weights and lesser unique sums updated, but all non-root nodes of the subtree (node B, node C and leaf nodes B-F) may need to be checked to determine if their normalized weight is outdated. These steps are laid out in further detail below.

Method 400 further includes updating and storing normalized weights of the sibling group of the selected node 406. As mentioned above, the modified node is initially "selected," though this may change as method 400 proceeds. As described above, the normalized weights of the siblings may not be affected, depending upon how the node is modified. However, if the proportional weights and/or lesser unique sums of the modified node or its siblings change, then the normalized weights may be recalculated according to Equation 1.

Method 400 further includes determining whether any of the nodes of the sibling group have children that need to be updated (408 and 412 for the selected node and its sibling, respectively). As used here, "updating" a node refers to recalculating a normalized weight. This is due to how calculating a normalized weight of a node via Equation 1 depends upon the proportional weights and lesser unique sums of parents of the node. Thus, if a sibling in the selected sibling group has an updated proportional weight or lesser unique sum as a result of the modification, the normalized weights of that sibling and any children of that sibling may change. However, if the proportional weight and lesser unique sum of the sibling did not change, the normalized weights of that sibling and all of its children will remain unaffected. Note that operation 408 also considers whether any children of the modified node itself need to be updated, although if the modified node has any children, the children will always need to be updated. Modifying a node will not affect the proportional weight or the lesser unique sum of any child of the modified node or children of the modified node's siblings.

If the selected node has a child that needs to be updated (408 "yes"), method 400 further includes selecting that child 410 and updating the normalized weights of the child's sibling group 406. The normalized weights are also updated according to Equation 1. The same checks are made to determine whether the child has any children that need updating (408) or whether any of the child's siblings have any children that need updating (412). Thus, method 400 works from the modified node downward to update children's normalized weights as needed.

Once 412 is "no" (no children need updating), method 400 includes determining whether the currently-selected node is a member of the modified node's sibling group 416, and if not, selecting the parent node 418 and repeating the "sibling children" check 412. This is essentially a way to ensure that no child nodes that may need to be updated are missed. In other words, if node A 204 is modified from weight 5 to a weight of 1, method 400 includes updating the proportional weights, lesser unique sums, and normalized weights of node A 204 and leaf A 206, then node B 208 and node C 210, then leaf B 212 and leaf C 214. Operations 416 and 418 looping back to 412 make sure that leaf nodes D-F (216-220, respectively) are updated as well, if necessary.

Once all nodes that need to be updated have been updated (416 "Yes"), method 400 ends 420. Notably, parents of the modified node are unaffected, as well as "cousins" and their children. As the prior art typically requires recalculating an entire tree whenever a node is modified, method 400 represents an advantageous improvement in efficiency by reducing computational waste.

Figure 5:
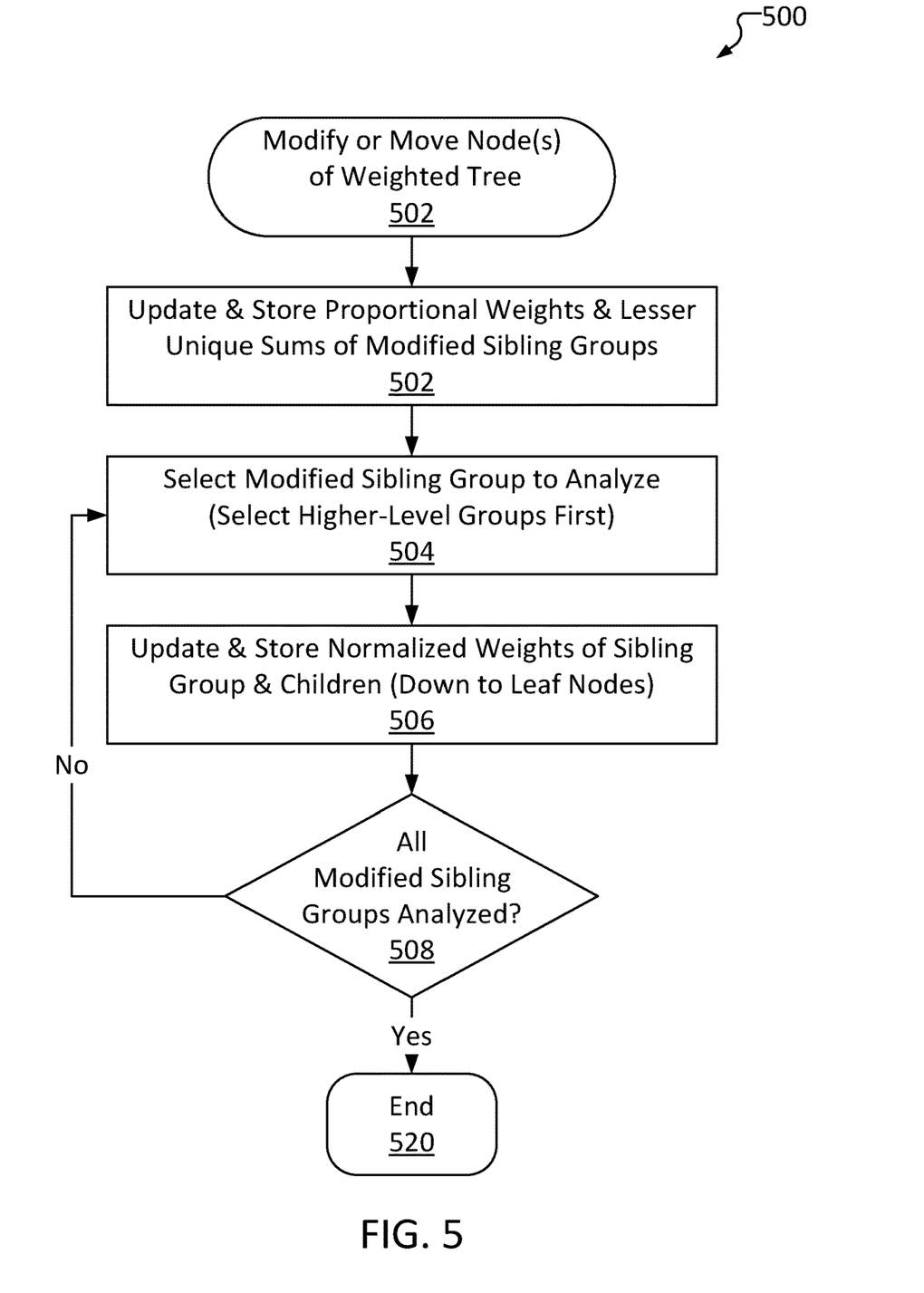
FIG. 5 illustrates a high-level block diagram of a weighted tree update method based on modifying multiple nodes according to several embodiments of the present disclosure.

FIG. 5 illustrates a high-level block diagram of a weighted tree update method 500 based on modifying multiple nodes according to several embodiments of the present disclosure. Method 500 includes modifying multiple nodes of a weighted tree or moving one or more nodes between sibling groups 502.

Method 500 further includes updating and storing the proportional weights and lesser unique sums of modified sibling groups 502. As used herein, a "modified sibling group" refers to a sibling group containing at least one node which has been added, modified, or deleted. For each modified sibling group, operation 502 may be performed in a manner similar to operation 404 of method 400, operations 306 and 308 of method 300, etc. This may include "updating a subtree," as described above with reference to method 400; in general, updating a subtree involves identifying a subtree as a weighted tree whose root node is the parent node of a selected sibling group, determining whether the proportional weights and lesser unique sums of the nodes in the selected sibling group need to be updated (and updating them if needed), and determining whether the normalized weights of all non-root nodes in the subtree need to be updated (and updating them if needed as well).

With the proportional weights and lesser unique sums of the modified sibling groups updated, method 500 further includes selecting a modified sibling group for analysis 504. If multiple sibling groups have been modified, operation 504 may optionally include selecting the highest-level modified sibling group (or one of them, if multiple modified sibling groups are on the same level). As used herein, a sibling group being "high-level" refers to relational "distance" from the root node; a sibling group whose parent is the root node may be considered the highest-level sibling group in the tree. Notably, presence of leaf nodes does not determine whether a sibling group is high-level or not; the highest-level sibling group may include leaf nodes, and a sibling group comprised entirely of leaf nodes may not necessarily be the lowest-level sibling group of the tree (while the lowest-level sibling group of the tree will necessarily consist entirely of leaf nodes, a large tree may include multiple such sibling groups on different levels).

With a modified sibling group selected, method 500 further includes updating and storing the normalized weights of the sibling group and children of the nodes in the sibling group, down to leaf nodes 506. This may be performed in a manner similar to operations 406-420 of method 400; the normalized weights of the sibling group are updated as needed, then any children are updated, then the children's children, and so on. However, as described in the discussion of method 400, above, modifying a sibling group will not affect higher-level sibling groups or "cousins" of the modified sibling group. Thus, only siblings and children (and children's children, and all children's siblings, and so on) are considered in operation 506, to reduce redundant calculations. However, as multiple sibling groups may be modified in operation 502, a single iteration of operation 506 may not be necessary to ensure that all nodes are updated as needed.

Thus, method 500 further includes determining whether all modified sibling groups have been analyzed 508. Of note, if a first modified sibling group comprises children of a node included in a second modified sibling group, then in performing operation 506 when analyzing the second modified sibling group, both modified sibling groups will be updated. Thus, the first modified sibling group may be considered to have been "analyzed" as well, possibly resulting in 508 "yes." However, if a third modified sibling group comprises a group of "cousins" to the second modified sibling group, the third group may not have been analyzed. If not all modified sibling groups (and therefore their children and so on) have not been analyzed (508 "no"), method 400 includes selecting another modified sibling group 504 and analyzes it and its children 506. This is why preferring to select higher-level modified sibling groups first may be beneficial; analyzing higher-level groups may include analyzing one or more lower-level groups (though will not necessarily do so), possibly reducing needed computational resources.

Once all modified sibling groups and their children have been analyzed (508 "Yes"), method 500 ends 520. Again, method 500 only recalculates an entire weighted tree if actually necessary; redundant calculations are significantly reduced, advantageously improving efficiency and performance of a system storing weighted trees.

Figure 6:
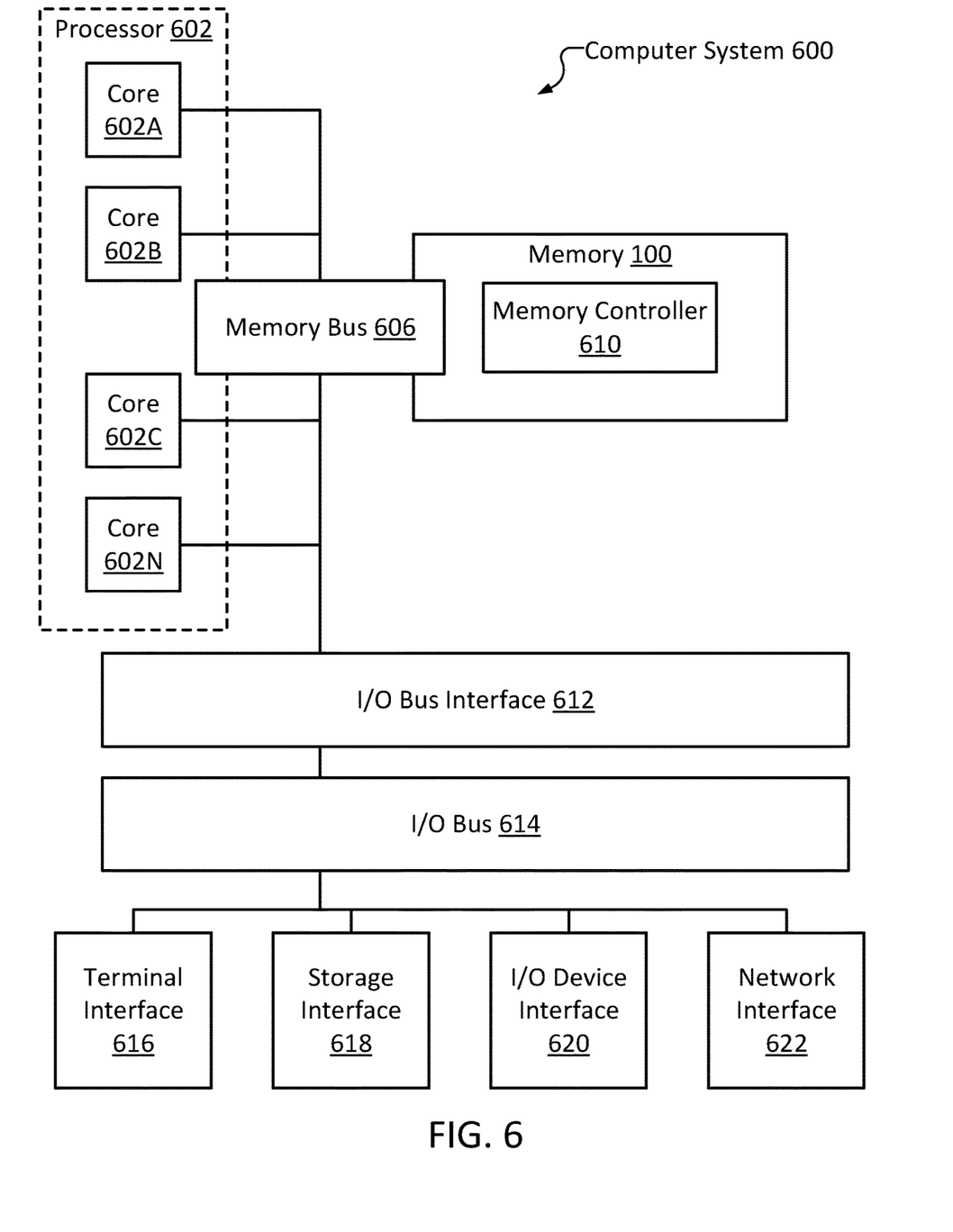
FIG. 6 illustrates a high-level block diagram of an example computer system that may be used in implementing embodiments of the present disclosure.

FIG. 6 illustrates a high-level block diagram of an example computer system 600 that may be used in implementing embodiments of the present disclosure. Example computer system 600 may be configured to perform various aspects of the present disclosure, including, for example, methods 300, 400 and 500. The example computer system 600 may be used in implementing one or more of the methods or modules, and any related functions or operations, described herein (e.g., using one or more processor circuits or computer processors of the computer), in accordance with embodiments of the present disclosure. In some embodiments, the major components of the computer system 600 may comprise one or more CPUs 602, a memory subsystem 100, a terminal interface 616, a storage interface 618, an I/O (Input/Output) device interface 620, and a network interface 622, all of which may be communicatively coupled, directly or indirectly, for inter-component communication via a memory bus 606, an I/O bus 614, and an I/O bus interface unit 612.

The computer system 600 may contain one or more general-purpose programmable central processing units (CPUs) 602, some or all of which may include one or more cores 604A, 604B, 604C, and 604D, herein generically referred to as the CPU 602. In some embodiments, the computer system 600 may contain multiple processors typical of a relatively large system; however, in other embodiments the computer system 600 may alternatively be a single CPU system. Each CPU 602 may execute instructions stored in the memory subsystem 100 on a CPU core 604 and may comprise one or more levels of on-board cache.

In some embodiments, the memory subsystem 100 may comprise a random-access semiconductor memory, storage device, or storage medium (either volatile or non-volatile) for storing data and programs. In some embodiments, the memory subsystem 100 may represent the entire virtual memory of the computer system 600 and may also include the virtual memory of other computer systems coupled to the computer system 600 or connected via a network. The memory subsystem 100 may be conceptually a single monolithic entity, but, in some embodiments, the memory subsystem 100 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 602. This may include a memory controller 610.

Although the memory bus 606 is shown in FIG. 6 as a single bus structure providing a direct communication path among the CPU 602, the memory subsystem 100, and the I/O bus interface 612, the memory bus 606 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 612 and the I/O bus 614 are shown as single respective units, the computer system 600 may, in some embodiments, contain multiple I/O bus interface units 612, multiple I/O buses 614, or both. Further, while multiple I/O interface units are shown, which separate the I/O bus 614 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
    receiving a weighted tree, the weighted tree having a plurality of nodes including at least:
        a first node having a first weight; and
        a second node having a second weight; and
    determining, based on the first weight and the second weight, a first normalized weight of the first node, the determining including:
        determining a first proportional weight of the first node;
        determining a first lesser unique sum of the first node; and
        determining, based at least on the first proportional weight and the first lesser unique sum, the first normalized weight.

2. The method of claim 1, wherein:
    the weighted tree comprises a decision tree;
    the first node represents a first decision;
    the second node represents a second decision; and
    the method further comprises:
        determining, based on the first weight and the second weight, a second normalized weight of the second node; and
        selecting, based on the first normalized weight and the second normalized weight.

3. The method of claim 1, wherein:
    the second node is a parent of the first node;
    the method further comprises:
        determining a second proportional weight of the second node; and
        determining a second lesser unique sum of the second node; and
    the determining the first normalized weight is based further on the second proportional weight and the second lesser unique sum.

4. The method of claim 1, wherein:
    the second node is a sibling of the first node;
    the determining the first proportional weight is based on the first weight and the second weight; and
    the determining the first lesser unique sum is based on the first weight and the second weight.

5. The method of claim 1, further comprising:
    selecting one of the plurality of nodes, the selected node having one or more siblings;
    deleting the selected node;
    updating, based on the deleted node and the one or more siblings, a subtree, wherein:
        the subtree includes a subtree root node and at least one subtree non-root node;
        a parent node of the one or more siblings includes the subtree root node; and
        the updating the subtree includes updating at least a normalized weight of at least one subtree non-root node.

6. The method of claim 1, further comprising:
selecting one of the plurality of nodes, the selected node having a selected node weight;
identifying a subtree, wherein:
the subtree includes a subtree root node;
the subtree includes a plurality of subtree non-root nodes; and
a parent node of the selected node comprises the subtree root node;
deleting the selected node; and
determining, based at least on the selected node weight, not to update at least one of the plurality of subtree non-root nodes.

7. The method of claim 1, further comprising:
adding a new node, the new node having a new weight;
determining a new proportional weight of the new node;
determining a new lesser unique sum of the new node;
determining, based at least on the new proportional weight and the new lesser unique sum, a new normalized weight; and
updating, based on the new weight, a subtree, wherein:
the subtree includes a subtree root node;
a parent node of the new node comprises the subtree root node; and
the updating the subtree includes updating at least a normalized weight of a node of the subtree.

8. The method of claim 1, further comprising:
selecting one of the plurality of nodes, the selected node having a selected node weight;
modifying the selected node weight to a modified node weight; and
updating, based on the modified node weight, a subtree, wherein:
the subtree includes a subtree root node;
a parent node of the modified node comprises the subtree root node; and
the updating the subtree includes updating at least a normalized weight of a node of the subtree.

9. A system, comprising:
a memory; and
a central processing unit (CPU), the CPU configured to:
receive a weighted tree, the weighted tree having a plurality of nodes including at least:
a first node having a first weight; and
a second node having a second weight; and
determine, based on the first weight and the second weight, a first normalized weight of the first node, the determining including:
determining a first proportional weight of the first node; and
determining a first lesser unique sum of the first node; and
determining, based at least on the first proportional weight and the first lesser unique sum, the first normalized weight.

10. The system of claim 9, wherein:
the second node is a parent of the first node;
the CPU is further configured to:
determine a second proportional weight of the second node; and
determine a second lesser unique sum of the second node; and
the determination of the first normalized weight is based further on the second proportional weight and the second lesser unique sum.

11. The system of claim 9, wherein:
the second node is a sibling of the first node;
the CPU is configured to determine the first proportional weight based on the first weight and the second weight; and
the CPU is configured to determine the first lesser unique sum based on the first weight and the second weight.

12. The system of claim 9, wherein the CPU is further configured to:
select one of the plurality of nodes, the selected node having one or more siblings;
delete the selected node;
update, based on the deleted node and the one or more siblings, a subtree, wherein:
the subtree includes a subtree root node and at least one subtree non-root node;
a parent node of the one or more siblings comprises the subtree root node; and
the updating includes updating at least a normalized weight of a node of the subtree.

13. The system of claim 9, wherein the CPU is further configured to:
add a new node to the weighted tree, the new node having a new weight;
determine a new proportional weight of the new node;
determine a new lesser unique sum of the new node;
determine, based at least on the new proportional weight and the new lesser unique sum, a new normalized weight; and
update, based on the new weight, a subtree, wherein:
the subtree includes a subtree root node;
a parent node of the new node comprises the subtree root node; and
the updating includes updating at least a normalized weight of a node of the subtree.

14. The system of claim 9, wherein the CPU is further configured to:
select one of the plurality of nodes, the selected node having a selected node weight;
modify the selected node weight to a modified node weight; and
update, based on the modified node weight, a subtree, wherein:
the subtree includes a subtree root node;
a parent node of the modified node comprises the subtree root node; and
the updating includes updating at least a normalized weight of a node of the subtree.

15. A computer program product, the computer program product comprising a computer readable storage medium having program instructions embodied therewith, the program instructions executable by a computer to cause the computer to:
receive a weighted tree, the weighted tree having a plurality of nodes including at least:
a first node having a first weight; and
a second node having a second weight; and
determine, based on the first weight and the second weight, a first normalized weight of the first node, the determining including:
determining a first proportional weight of the first node;
determining a first lesser unique sum of the first node; and
determining, based at least on the first proportional weight and the first lesser unique sum, the first normalized weight.

16. The computer program product of claim 15, wherein:
the second node is a parent of the first node;
the instructions further cause the computer to:
   determine a second proportional weight of the second node; and
   determine a second lesser unique sum of the second node; and
the determining the first normalized weight is based further on the second proportional weight and the second lesser unique sum.

17. The computer program product of claim 15, wherein:
the second node is a sibling of the first node;
the instructions further cause the computer to determine the first proportional weight based on the first weight and the second weight; and
the instructions further cause the computer to determine the first lesser unique sum based on the first weight and the second weight.

18. The computer program product of claim 15, wherein the instructions further cause the computer to:
   select one of the plurality of nodes, the selected node having one or more siblings;
   delete the selected node;
   update, based on the deleted node and the one or more siblings, a subtree, wherein:
      the subtree includes a subtree root node and at least one subtree non-root node; and
      a parent node of the one or more siblings comprises the subtree root node; and
      the updating includes, for at least one subtree non-root node, updating a subtree node normalized weight of the subtree non-root node to an updated normalized weight.

19. The computer program product of claim 15, wherein the instructions further cause the computer to:
   add a new node to the weighted tree, the new node having a new weight;
   determine a new proportional weight of the new node;
   determine a new lesser unique sum of the new node;
   determine, based at least on the new proportional weight and the new lesser unique sum, a new normalized weight; and
   update, based on the new weight, a subtree, wherein:
      the subtree includes a subtree root node;
      a parent node of the new node comprises the subtree root node; and
      the updating includes updating at least a normalized weight of a node of the subtree.

20. The computer program product of claim 15, wherein the instructions further cause the computer to:
   select one of the plurality of nodes, the selected node having a selected node weight;
   modify the selected node weight to a modified node weight; and
   update, based on the modified node weight, a subtree, wherein:
      the subtree includes a subtree root node;
      a parent node of the modified node comprises the subtree root node; and
      the updating includes updating at least a normalized weight of a node of the subtree.

* * * * *